Dec. 4, 1956  J. DENNETT  2,772,515
MANUFACTURE OF HOLLOW BLOCKS OF GLASS
Filed June 13, 1952  3 Sheets-Sheet 1

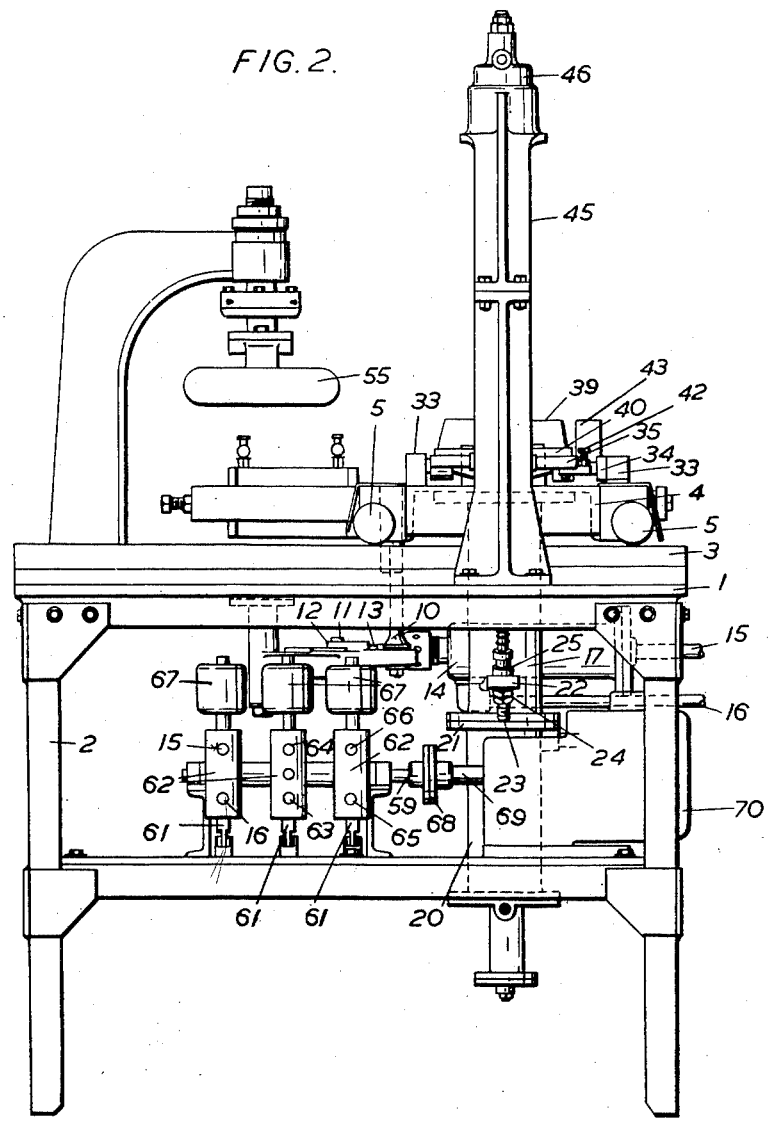

Dec. 4, 1956  J. DENNETT  2,772,515
MANUFACTURE OF HOLLOW BLOCKS OF GLASS
Filed June 13, 1952  3 Sheets-Sheet 3
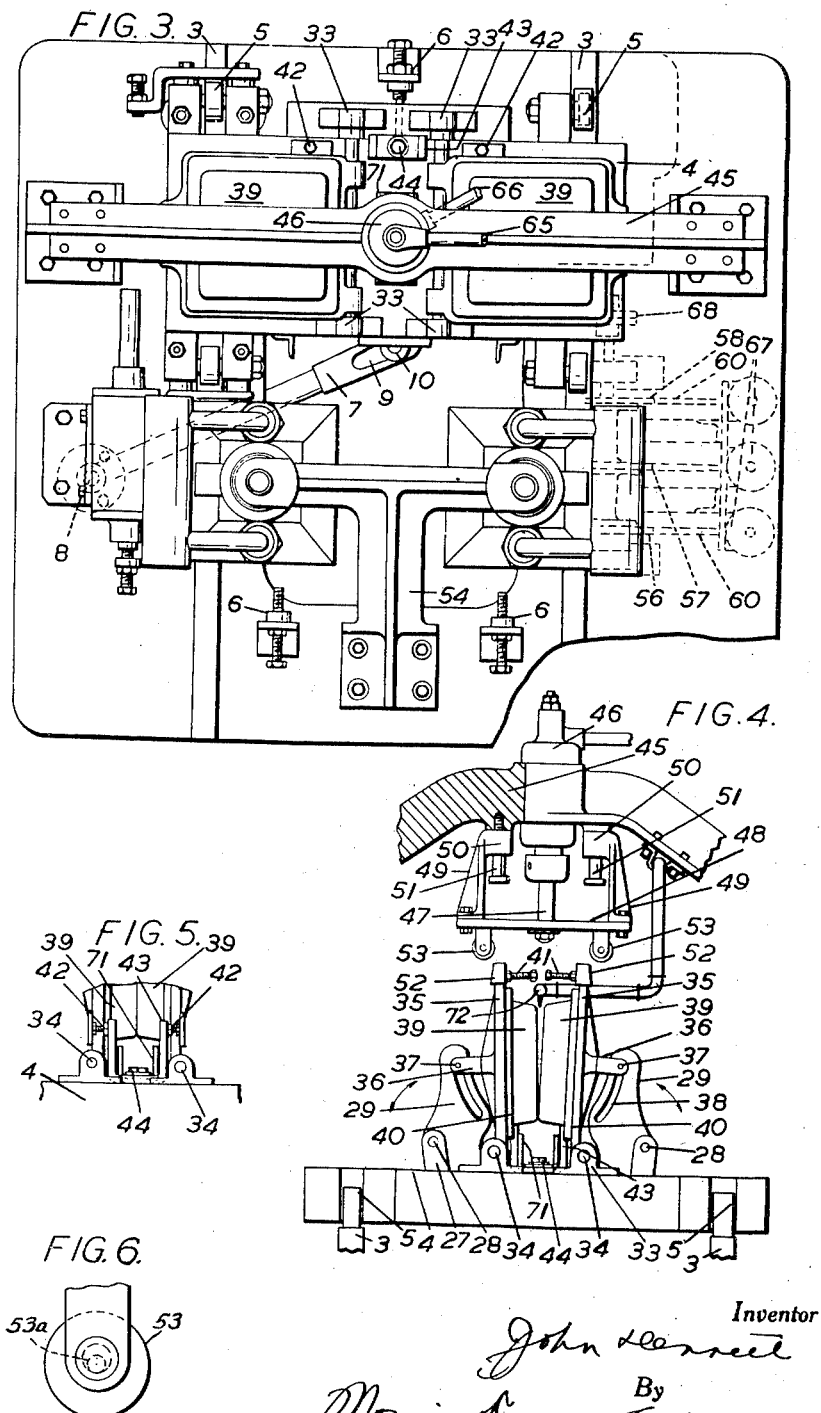

United States Patent Office 2,772,515
Patented Dec. 4, 1956

2,772,515
MANUFACTURE OF HOLLOW BLOCKS
OF GLASS

John Dennett, Windle, St. Helens, England, assignor to Pilkington Brothers Limited, Liverpool, England, a British company Application June 13, 1952, Serial No. 293,335
Claims priority, application Great Britain July 16, 1951
13 Claims. (Cl. 49—1)

This invention relates to the manufacture of hollow blocks of glass.

These blocks are used as building blocks in the construction of interior and exterior walls. They are usually of rectangular form comprising two square faces spaced apart and connected by rectangular walls which are narrow as compared with the sides of the square faces.

These hollow building blocks of glass usually comprise two exactly similar hollow half blocks comprising a rectangular base and four walls all integral one with the other and the base, the half blocks being produced in a mould by pressing.

In forming a glass block the two half blocks have been cemented or welded together at the rims. Many experiments have been made to find a suitable cement which is not only a secure adhesive in respect of glass, but is also inert to atmospheric conditions. Experiments have also been made on the basis of metallising the rims of the half blocks and then welding together the metal faces of the rims, thereby eliminating the trouble of finding a cement which will withstand the erosions of the atmosphere in which the block is used; and, owing to the expense of joining together the half blocks bp metallising and then welding, attempts have been made to directly weld together the rims of the half blocks so that there is no joint which can be attacked by acids or other chemical constituents of the atmosphere in which the blocks are used.

In the manufacture of the half blocks it has been proposed to mould each half in one pair of moulds which are hinged together on a common axis and which during moulding lie flat. A gob is fed to each mould and a head with plungers then decends on to the moulds to press out the two half blocks. The head is then retracted and the moulds immediately tilted upwardly, like closing a book, so that the soft rims of the freshly moulded half blocks are brought together with sufficient pressure to cause welding.

In order to avoid sagging of the upper walls of the half blocks when the latter are in a vertical position, it has been proposed to carry out a similar operation to that already described in which the moulds are moved round through 90° so that a corner of each half block is near to the hinge instead of having two sides parallel to the hinge.

In this latter proposal each mould is separately hinged and the hinges are parallel, and after pressing out the half blocks in the pair of moulds the latter are tilted up to vertical position and in one and the same continuous movement are displaced laterally to bring the rims of the two half blocks together over the full extent of their surfaces, pressure being applied at the back of the moulds to produce the pressure requisite to effect welding.

In order to regulate the pressure obtaining within a hollow glass block of the kind described when cold, it has been proposed to heat the rims of the two parallel half blocks to above their softening point to permit welding, whilst disposed coaxially in horizontal plane with the cavities face to face, by an endless burner disposed between their rims and at the same time the gas within the half blocks is extracted so that the products of combustion emanating from the burner are entirely removed from the cavity within each half block. As soon as the burner is removed, a considerable displacement of the upper half block down to the lower half block is effected to bring together the softened rims and then sufficient pressure is applied to cause welding. This proposal has been modified in that instead of continuously extracting during the heating up process, the gaseous contents of the cavities produced during the softening of the rims, a dwell is produced towards the end of the downward movement of the upper half blocks so that they become closely spaced for a predetermined time which dwell permits the trapped gases to exude from the cavities to a desired extent before the two halves are actually brought together.

A main object of the invention is to provide an improved method of manufacture and an apparatus therefor whereby the gaseous atmosphere trapped in the blocks is at a predetermined temperature so that the final pressure within the blocks is predetermined by the method of closing.

A method of welding together hollow half blocks of glass to form a hollow glass building block in which the rims of the half blocks are heated to above softening point just prior to welding in accordance with the invention is characterised by locating the half blocks on their bases in spaced side by side relation, heating the rims of said half blocks to above the softening point of the glass to permit the welding of the rims, tilting up the half blocks with their rims heated so that the soft rims of the lowermost nearer rim parts meet and then roll on one another as the rims of the side walls approach to close proximity one to the other, whereby the rapidly expanding gaseous volume encompassed between the half blocks is constrained to exude mainly between the portion of the rims in the uppermost parts of the half blocks, applying a force to each of the half blocks to effect welding over the whole of the rims, the movement of the platen being continuous, and regulating the period of time between the side walls reaching the position of close proximity and the moment of welding, so as to control the ultimate gaseous pressure in the cavity of the block when cool.

The period of time during which the encompassed gases exude past the uppermost parts of the half blocks may be precisely regulated by slowing down of the movement, that is to say, during the last 5° movement of each of the half blocks to vertical position.

The atmosphere immediately above the tilted up half blocks may be heated so that the descent of relatively cold atmospheric air into the cavity encompassed by the half blocks during the final steps of egress of the enclosed gaseous volume is prevented.

The invention also comprises apparatus for use in welding together two half blocks of glass the rims of which are at a temperature above softening point to permit welding, comprising two platens, means on each platen for locating a half block in predetermined relative positions, whereby on tilting up the platens the rims of the half blocks will be in register, and the contiguous parallel walls of the half blocks on the platen will be in spaced relation in order to ensure the initial engagement of the located rims of the lowermost parts thereof, actuating means for tilting up the platens until they are nearly vertical, and independent means adapted to force the platens, at a speed slower than that of the tilting movement, into their vertical positions when the whole areas of the rims have arrived in a position of close proximity, by operating against their backs near their upper edges.

A machine constructed according to the invention preferably comprises a carriage for a pair of platens in juxtaposed position, each formed to carry a half block, tracks for the carriage running from the front to the back of the machine, the platens being hinged at their adjacent ends to the carriage along parallel axes and each provided with a central depending stirrup, a pair of slotted levers in one vertical plane hinged to the underside of the carriage in the vicinity of the platen hinges, each stirrup carrying a pin which rides freely in the slot of the respective lever, a pneumatically actuated operating plunger mounted on the carriage and below said levers and resilient means for simultaneously communicating the movements of said plunger to both the levers, the stroke of the operating plunger being such as to terminate the movement of the slotted levers as the platens approach the vertical position.

The independent means may comprise diverging ramps on the backs of the platens in contiguity with their upper edges, and a reciprocating plunger, the axis of which is disposed in the middle plane between the platens, said plunger carrying spaced rollers adapted to bear on the diverging ramps as the plunger descends to effect a wedging action by which the half blocks are forced together until they are in a true vertical position, that is to say, in absolute parallelism, thereby effective welding of the heated rims of the half blocks carried by the platens is ensured.

The platens preferably carry adjustable stops near their free ends so as to limit the inward movement of the platens under pressure and thereby protect the walls of half blocks against malformation during the application of the welding pressure.

In order to determine accurately the distance apart of the platens at the bottom when the platens are in the vertical position under pressure and play exists in the platen hinges, the platens may also carry adjustable stops near their hinged ends.

The plunger which operates the rollers is preferably pneumatically operated and actuated in sequence after the plunger operating the slotted levers, so that the final pressure for welding follows the tilting up of the platens to present the half blocks in nearly vertical position one to the other, the operations of the plungers being effected by cam mechanism, the angular setting of which is adjusted so that mutual advance of the half blocks one to the other is taken over from the slotted levers by the independent wedging mechanism.

Preferably, apparatus according to the invention comprises endless burners for heating the rims to above the softening point and the carriage in such cases is movable under these burners from a datum position and then back to the datum position in which latter the half blocks with their edges heated are disposed in the platens so that when the platens have been tilted up to vertical position the final pressure for welding can be applied. The excursions of the carriage are preferably produced by a swinging arm actuated by a plunger operated by compressed air and the movement of this plunger may be effected in sequence with the other plungers by cam mechanism, so that as a sequence of operations the platens may be loaded, moved under the burners by which the rims are heated to above the softening point, brought back to datum position, tilted up to nearly vertical position and then, finally pressed together to truly vertical position so that the rims of the two half blocks are applied one to the other over their whole surface under sufficient pressure to effect welding.

By disposing the axes of the platens in spaced parallel relation so that the contiguous parallel walls of the half blocks located thereon are disposed to ensure the described initial engagement of these parts of the rims of the half blocks, the welding pressure is applied in a direction which is substantially normal to the rim faces of the half blocks thereby avoiding distortion which may occur if the pressure is applied in a direction which is substantially inclined to the rim faces.

By the method of operation in accordance with the present invention a rarified atmosphere of predetermined pressure is included within the glass block; thereby the thermal and acoustic conductivity of the blocks is reduced as compared with blocks in which atmospheric air is trapped and ultimate condensation within the blocks is substantially eliminated.

Accordingly by eliminating cold atmospheric air from the cavity within the hollow block a subsequent rise in temperature of the trapped gaseous volume derived from the heat in the half blocks which may lead to such an increase of internal pressure as to lead to rupture is avoided.

The apparatus according to the invention may include a linear burner disposed centrally above the support for the platens so as to heat the atmosphere above the half blocks whilst they approach the nearly closed position. By such means the atmosphere immediately above the half blocks is heated to at least the temperature of the air within the half blocks so that the cavity in the half blocks cannot be filled with cold air of undetermined humidity. By providing the burner, the egress of the gases in the half blocks due to the heat at the rims is accelerated, thereby the final pressure of the air in the building blocks after the two half blocks have been welded together may be regulated whilst minimum loss of heat at the rims is achieved.

In order that the invention may be more clearly understood, a preferred embodiment thereof will now be described by way of example, reference being made to the accompanying drawings in which:

Fig. 2 is a side elevation of the apparatus,

Fig. 3 is a plan view of the apparatus,

Fig. 4 is a detail view of the carriage and means for applying pressure to the half blocks, Fig. 5 is a detail view of part of the apparatus shown in Fig. 4, but from the other side of the machine, and Fig. 6 is a detail of a roller shown in Fig. 4.

Figure 1:
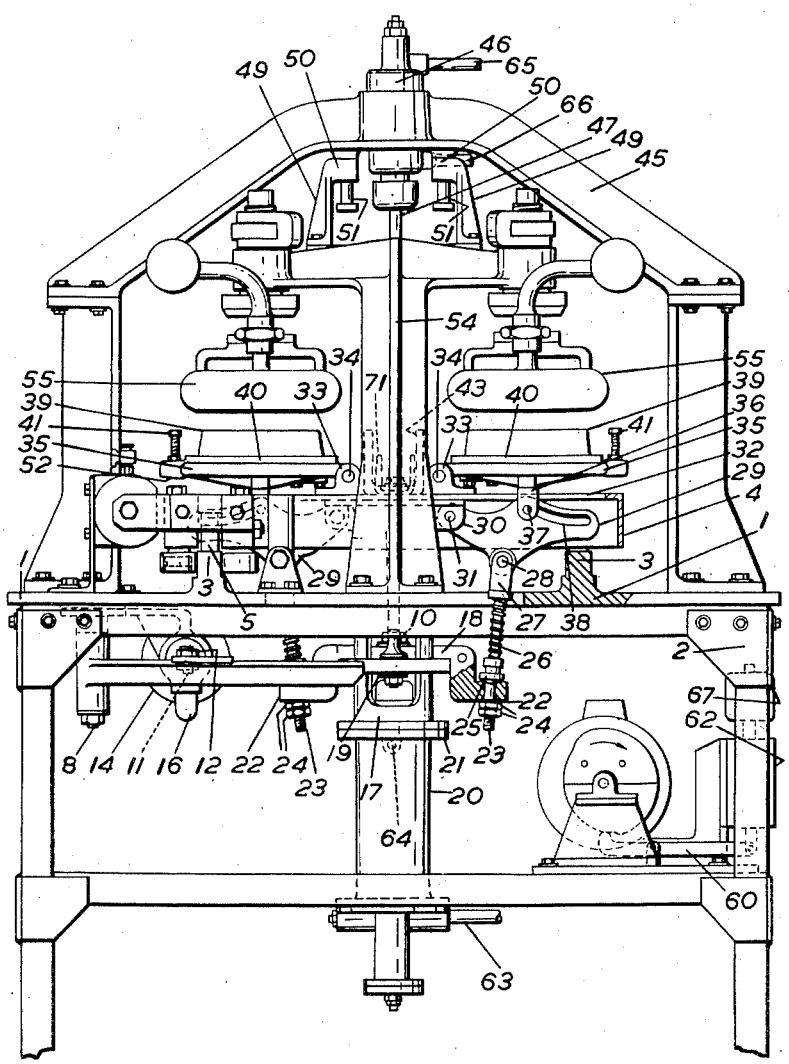
Fig. 1 is a rear elevation of a glass block making apparatus partly cut away.

In this embodiment, the glass welding machine comprises a bed 1 supported on a frame comprising legs 2, which bed carries rails 3 extending from the front to the back (i. e. lengthwise) of the machine and a travelling carriage 4 provided with wheels 5 which run on the rails 3 and which is given to and fro motion, between adjustable stops 6 (see Fig. 3) mounted on the bed 1, by an arm 7 pivoted on stud 8 carried under the bed 1 at one side of the machine and provided at the free end with a slot 9 for a spindle 10 depending vertically from the carriage 4. About midway of the length of this swinging arm 7, the latter is articulated at 11 to the free end 12 of a plunger 13 connected to a piston working in a double acting cylinder 14 supplied with motive fluid by conduits 15 and 16, the cylinder being carried under the bed 1 and being disposed lengthwise thereof.

Depending from the carriage 4 through a slot running lengthwise of the bed is a guide 17 for a crosshead 18 mounted on a vertically disposed plunger 19 connected to a piston working in a double acting cylinder 20 bolted to the guide 17 by the flange 21, so that the cylinder 20 is suspended under the bed 1. The arrangements are such that the axis of the cylinder 20 lies in the medial vertical plane of the bed 1, in which plane also is the axis of the spindle 10 to which is connected the swinging arm 7 which effects the to and fro excursion of the carriage 4.

Each end of the crosshead 18 is cranked and each offset 22 is pierced to receive the lower end of a spindle 23 which end is threaded for the reception of lock nuts 24 below the offset 22. On each respective spindle 23 is threaded a convex faced bearing element 25 which is resiliently pressed on the respective offset 22 by a helical spring 26 carried on the spindle 23 and which abuts against a head 27 to the spindle. Each spindle head 27 is forked and the limbs of the fork are pierced to receive a pin 28 in which rocks a vertically disposed slotted lever 29. Each lever 29 extends towards the middle of the machine and to brackets 30 carrying hinge pins 31 on the underside of the carriage 4 on which the levers 29 can rock vertically and the travelling carriage 4 has transverse openings 32 permitting both levers 29 to rise simultaneously through the top thereof. Accordingly, the levers 29 are hinged at equal distances from the aforesaid medial plane of the machine and have symmetry of movement to each side thereof corresponding to the movement imparted by the reciprocation of the crosshead 18.

On the carriage 4 are mounted bearings 33 for the hinge pins 34 of a pair of juxtaposed platens 35 which normally have a horizontal position as shown in Fig. 1. The hinge pins 34 are at adjacent ends of the respective platens 35 and are somewhat nearer the aforesaid medial plane than the hinge pins 31 of the levers 29, and centrally below each platen 35 depends a stirrup 36 carrying a pintle 37. The stirrup 36 straddles the respective lever 29 and the pintle 37 runs in an arcuate slot 38 formed in the lever 29, hence the lever 29 is a cam lever, in which the cam is constituted by the arcuate slot 38. Thus the normal horizontal position of the platens 35 is obtained from the support given by the levers 29 to the pintles 37 which in turn is obtained from the crosshead 18; and when the latter is in the lowermost position the platens 35 are horizontal.

As the crosshead 18 rises the levers 29 rock upwardly on their axis pins 31, and the platens 35 are tilted upwardly on their axis pins 34, as the cam slots 38 in the levers 29 continually transmit the effort from the crosshead 18, and move the platens 35 toward the medial plane of the machine. Thus it will be seen that if half blocks 39 are properly located in the platen 35 the latter can be tilted upwardly until both rims of the half blocks 39 are in register for welding.

The platens 35 are provided with removable rings 40 which locate the half blocks 39 in proper position on the platens, and the free ends and hinged ends of the platens are provided with adjustable stops 41 and 42 respectively, to determine accurately the distance apart of the platens at both top and bottom in the closed position and to ensure that the platens are parallel in this position. The stops 42 bear on the vertical limbs of the U-shaped brackets 43 (see Figs. 2, 3, and 4) bolted to the carriage 4 by bolt 44.

Over the front part of the machine is a bridge 45 in the crown of which is mounted a vertically disposed double acting cylinder 46 guiding a piston from which depends a plunger 47 carrying an upper crosshead 48 (see Figure 4) each arm of which is provided with a bracket 49 carrying a bearing 50 which slides on a vertical guide pin 51 thus the crosshead 48 is exactly positioned with respect to the platens 35. The ends of the platens 35 are provided with a ramp 52 and these ramps diverge downwardly when the platens are raised; and the crosshead 48 carries two freely mounted rollers 53 which run down the respective ramps 52 as the upper crosshead 48 descends under the action of the piston thus applying the requisite pressure to the platens 35 (in the manner of wedging) to effect efficient welding of the rims of the half blocks 39 mounted on the platens 35. The rollers 53 are mounted on eccentric pins 53a (Fig. 6) so that their respective distances from the centre line of the machine, and hence the uprightness of the block after welding, as well as the extent the half blocks are squeezed together, may be adjusted by partial rotation of the pins, which are adapted to be locked in the desired position.

The sequence of operations is such that the upper crosshead 48 descends to take over the final tilting of the platens 35 to truly vertical position, i. e. through the last 5° or so, from the control thereof up to that point achieved from the crosshead 18 below the bed 1.

The guide pins 51 of the upper crosshead 48 may carry helical springs (not shown) to accelerate the release of the platens 35 to the control from the lower crosshead 18 when the platens 35 are being separated after welding.

At the back of the machine and carried on a post 54 rising from the bed 1 are a pair of burners 55 so positioned with respect to the bed that when the carriage 4 is moved to the back of the machine the platens 35 are disposed under the burners 55, thereby the pairs of freshly moulded half blocks 39 may be loaded on to the platens 35, when in the front of the machine (in the position shown in Fig. 2), the platens moved below the burners to raise the temperature of their rims above the softening point of the glass so that they can be welded, and then returned to the front of the machine below the bridge 45 where the platens are tilted upwardly by plunger 19 acting on crosshead 18 and finally wedged together with the half blocks between them by operation of rollers 53 on ramps 52 so that an efficient welding is effected.

The slots 38 in the levers 29 are devised so that the later continuous movement thereof effected by the lower crosshead 18 is gradually decelerated so as to permit a predetermined egress of the gases trapped in the cavities of the half blocks 39 and thus determine the gaseous content on welding and the approximate final internal pressure in the cold blocks.

During the upward movement of the platens 35, the first contact between the half blocks 39 occurs along the lower parts of their rims and these parts virtually roll on one another as the side walls of the half blocks 39 approach. During the movement the gaseous contents within the half blocks is rapidly heated up and naturally exudes (for the major part) between the tops of the opposed rims, and the final movement (say of 5° or so) governed by the form of the slots in the slotted levers 29 and the upper crosshead 48 is given a predetermined period of time to regulate the quantity of the final gaseous content.

To ensure obstruction to the entry of atmospheric air a linear burner 72 (Fig. 4) may be arranged to heat the external air just above the half blocks when in vertical position. This burner may be carried by supports depending from the bridge 45.

The sequence of operations of the plunger 13 (Fig. 2) moving the swinging arm 7, by which the excursions of the carriage are controlled, of the plunger 19 which actuates the lower crosshead 18, and of plunger 47 which actuates the upper crosshead 48, is effected by coaxial cams 56, 57 and 58 on cam shaft 59 operating rockers 60 associated with spindles 61 of double acting slide valves 62 which regulate the flow to and exit from the respective double acting cylinders 14, 20 and 46 of air under pressure by way of pipes 15 and 16, 63 and 64 and 65 and 66 respectively. The spindles 61 carry weights 67 to maintain rockers 60 in contact with the cam faces 56, 57, 58. The cam shaft 59 is coupled by coupling 68 to the shaft 69 of a low speed electric motor 70.

By constructing a machine embodying the invention as above described a simple and effective mechanism is provided for assuring the perfect weld between the two half blocks and regulated ultimate pressure within them, which assures block stability of the structure and eliminates condensation during use under ordinary temperature conditions for which the blocks are designed.

The freshly moulded half blocks can be loaded on to the platen when at the back of the machine, so that they are disposed immediately under the burners, and then moved to the tilting station at the front of the machine where welding is effected.

On completion of the welding operation, the rollers 53 having been withdrawn from the ramps 52 and the levers 29 started their return journey, the welded block drops a short distance to a platform of material of the nature of asbestos cement sheet supported on the U-shaped bracket 71, from which it may be removed to an annealing lehr.

I claim:

1. Apparatus for use in welding together two half blocks of glass the rims of which are at a temperature above the softening point to permit welding, the apparatus comprising two platens, means on each platen for locating a half block in predetermined relative positions, whereby on tilting up the platens the rims of the half blocks will be in register, and the adjacent parallel walls of the half blocks on the platens will be in spaced relation in order to ensure the initial engagement of the rims thereof, actuating means for tilting up the platens continuously until they are nearly vertical, and independent means effective to operate against the back of the platens to force the platens, at a speed slower than that of the tilting movement, into their vertical positions when the whole areas of the rims have arrived in a position of close proximity.

2. Apparatus according to claim 1, wherein endless burners are provided for heating the rims of the half blocks and the platens are mounted on a carriage, which is movable to carry the platens and the half blocks thereon under the burners and then under an actuating member of the said independent means.

3. Apparatus according to claim 2 wherein the movement of the carriage is effected by a swinging arm actuated by a plunger which is operated by pressure fluid.

4. Apparatus for use in welding together two half blocks of glass, the rims of which are at such a temperature as to permit welding, the apparatus comprising two platens to support the glass half blocks, actuating means for tilting the platens until they are nearly vertical, means for locating a half block in predetermined position in each platen so that on tilting the platens there will be upward progressively increasing contact of the rims in register as the platens tilt towards each other, and independent means effective to operate against the back of the platens to force the platens, at a speed slower than that of the tilting movement, into truly vertical positions from the position in which the platens are nearly vertical.

5. Apparatus according to claim 1, comprising a carriage for a pair of platens in juxtaposed position, each formed to carry a half block, tracks for the carriage running from the front to the back of the apparatus, the platens being hinged at their adjacent ends to the carriage along parallel axes and each provided with a central depending stirrup, a pair of slotted levers in one vertical plane hinged to the underside of the carriage in the vicinity of the platen hinges, each stirrup carrying a pin which rides freely in the slot of the respective lever, a pneumatically actuated operating plunger mounted on the carriage and below said levers and resilient means for simultaneously communicating the movements of said plunger to both the levers, the stroke of the operating plunger being such as to terminate the movement of the slotted levers as the platens approach the vertical position.

6. Apparatus according to claim 5, wherein the actuating means for tilting the platens, the independent means and the actuating plunger of the swinging arm are controlled in sequence by cam mechanism which controls admission of compresesd air to cylinders containing pistons which effect the movements of the swinging arm, the platens and the independent means.

7. Apparatus according to claim 1, wherein the said independent means comprises diverging ramps on the backs of the platens in contiguity with their upper edges, and a reciprocating plunger, the axis of which is disposed in the middle plane between the platens, said plunger carrying spaced rollers adapted to bear on the diverging ramps as the plunger descends to effect a wedging action by which the half blocks are forced together.

8. Apparatus according to claim 1, wherein the platens are provided with adjustable stops near their outer ends to limit the inward movement of the platens under the action of the independent means.

9. Apparatus according to claim 1 wherein the platens are provided with adjustable stops near their hinged ends to determine accurately the distance apart of the platens at the bottom when the platens are in the vertical position under pressure and play exists in the platen hinges.

10. Apparatus according to claim 1, wherein a burner is arranged above the platens to heat the atmosphere above the half blocks while they approach the nearly closed position.

11. In apparatus for the manufacture of hollow blocks of glass from two half blocks, the provision of a pair of platens to support the half blocks, a hinge at one edge of each of the platens to allow tilting of the platens upwardly and towards each other, the said edges parallel, a ramp at the back of each platen remote from the hinged edge, means for tilting the platens towards the vertical position and clamping means comprising a plunger carrying spaced rolls disposed to run on the said ramps and so wedge together the platens whereby the half blocks disposed between them have their rims tightly held together, said rolls being mounted on eccentric pins to permit adjustment of the extent to which the half blocks are squeezed together.

12. Apparatus for use in welding together two half blocks of glass, the rims of which are at such a temperature as to permit welding, the apparatus comprising two platens, means on each platen for locating a half block in predetermined position thereon, so that on tilting the platens upward toward each other, there will be upward progressively increasing contact of the rims in registry, actuating means for tilting up the platens until they are nearly vertical, and independent means effective to operate against the backs of the platens to force the platens into their vertical positions at a controlled speed slow enough to permit the gases from between the half blocks to escape from said half blocks while said half blocks are at the welding temperature, thereby to control the ultimate gaseous pressure in the cavities of the blocks when said blocks are cooled.

13. A method of welding together hollow half blocks of glass to form a hollow glass building block in which the rims of the half blocks are heated to above softening point just prior to welding characterised by locating the half blocks on their bases in spaced side by side relation, heating upwardly extending rims of said half blocks to above the softening point of the glass, tilting up the half blocks with their rims heated so that the soft rims of the lowermost adjacent rim parts meet and the half blocks then roll on to one another as the rims of the side walls approach to close proximity beginning at the bottom, whereby the rapidly expanding gaseous volume encompassed between the half blocks is constrained to exude mainly between the portion of the rims in the uppermost parts of the half blocks, applying a force to each of the half blocks to complete the tilting movement to effect welding over the whole of the rims, regulating the period of time between the side walls reaching the position of close proximity and the moment of welding, so as to permit the gases from between the half blocks to escape from said half blocks while maintaining the rims of said half blocks above the softening point of glass, thereby to control the ultimate gaseous pressure in the cavity of the block when cool, and positively heating the atmosphere above the tilted up half blocks to prevent descent of relatively cold atmospheric air into the cavity encompassed by the half blocks during the final stages of egress of the enclosed gaseous volume.

References Cited in the file of this patent

UNITED STATES PATENTS

| | | |
|---|---|---|
| 419,441 | Henning | Jan. 14, 1890 |
| 1,315,983 | O'Neill | Sept. 16, 1919 |
| 2,164,093 | Soubier | June 27, 1939 |
| 2,353,532 | Williams | July 11, 1944 |